Patented Sept. 9, 1924.

1,508,243

UNITED STATES PATENT OFFICE.

WALTER GEORGE PERKINS AND WALTER HENRY BEASLEY, OF LONDON, ENGLAND, ASSIGNORS TO METALS PRODUCTION COMPANY OF NORTH AMERICA INCORPORATED, OF NEW YORK, N. Y.

TREATMENT OF REFINED COPPER FROM COPPER OXIDE.

No Drawing.    Application filed March 27, 1923.    Serial No. 628,033.

*To all whom it may concern:*

Be it known that we, WALTER GEORGE PERKINS, a subject of the King of England, residing at London, in England, and WALTER HENRY BEASLEY, a subject of the King of England, residing at London, in England, have invented certain new and useful Improvements in the Treatment of Refined Copper from Copper Oxide, of which the following is a specification.

This invention relates to the treatment of finely divided copper oxide. In United States Patent No. 1,440,186 is described a process leading to the production of such oxide which consists in the treatment of a copper ore containing one or more oxidized copper compounds, by heating the crushed ore in a reducing gas for such a short time and at such a low temperature as to reduce the copper compound without melting or alloying the copper and without fritting the gangue, and so that the reduced material is obtained in a porous condition, and thereafter submitting the product to a leaching operation with an ammoniacal solvent of copper in the presence of air or oxygen. The ammoniacal solution is boiled or subjected to distillation to remove the ammonia and precipitate finely-divided copper oxide. There are various other processes such as that described in copending United States application Serial No. 580,298 in which finely-divided copper oxide is precipitated from an ammoniacal solution. We find that the copper oxide resulting from these processes contains about 72-80% of copper. A particular object of this invention is to obtain refined copper from finely-divided copper oxide, such as the products above referred to.

Some serious difficulties stand in the way of economically refining the finely-divided copper oxide. It is scarcely practicable to mix the finely-divided copper oxide with other copper-bearing materials in any open hearth or reverberatory furnace. Secondly, if the finely-divided copper oxide be heated in a reducing atmosphere so as to reduce the copper to the metallic state in the form of a fine powder, it would be possible to cool the copper in the reducing atmosphere and thus prevent re-oxidation for the time being. But when this powder is introduced into a refining furnace serious losses may arise through particles of copper being carried away as dust, and, owing to the oxidizing atmosphere of the refining furnace, re-oxidation of the metallic powder rapidly takes place, the oxidized particles will not readily fuse together and the formation of a satisfactory molten mass (which is essential to the refining process) is prevented.

According to this invention a process for the treatment of finely divided copper oxide so as to enable fine copper to be produced therefrom is characterized by heating the copper ore in a reducing atmosphere so as to produce copper in a finely divided state, cooling the copper in a reducing atmosphere and subsequently pressing it into cakes or blocks so that the surface of copper exposed is reduced to a point at which oxidation in a refining furnace will not interfere with fusion of the material.

The temperature of reduction of the copper oxide is in general considerably less than the temperature of the melting point of copper and the process is particularly intended for use in cases where the copper oxide employed is obtained by precipitation from an ammoniacal solvent of copper as above described.

We find that the purer the copper oxide is, the more easily will the metallic copper produced therefrom cake together.

The following is a description of one example of the application of this invention. An ore containing malachite and chrysocolla is crushed, subjected to a drying and preheating operation if necessary and subjected to reduction in a rotary cylindrical furnace through which a current of reducing gas is passed. The reduction takes place for such a short time (for fine particles about 1 m. m. diameter, about twenty minutes suffices) and at such a low temperature (about 400°–300° C.) as to reduce the copper compounds without melting or alloying the copper and without fritting the gangue, and so that the reduced material is obtained in a porous condition. This product is submitted to a leaching operation with an ammoniacal solvent of copper in the presence of air or oxygen. The solution, after filtration if necessary, is introduced into an ammonia-distillation apparatus supplied with super-heated steam to remove the ammonia, and the precipitated copper oxide is removed and dried as required. The finely-divided copper oxide is introduced into a muffle furnace which may be a rotary furnace, and heated in a reducing atmosphere of coal gas or other reducing gas, finely-divided metallic copper being very readily produced at a temperature much below the melting point of copper, about 500° C. The product is cooled in a reducing atmosphere and, if it has to be stored for a time, it may be stored in a reducing atmosphere. The finely-divided copper is then introduced into a briquetting press and made into blocks or briquettes, using ordinary briquetting pressures, such for example of 1.5 to 2 tons to the square inch. By this means the volume of the material is very greatly reduced, and coherent blocks are readily formed without the addition of any binding medium. These blocks are supplied to the feed hoppers of a copper refining furnace, and when discharged into the furnace they readily form a fluid molten mass without loss through disintegration or carrying away of particles as dust, and without re-oxidation. The molten mass is subjected to the usual refining process necessary for the production of pure metallic copper.

What we claim as our invention and desire to secure by Letters Patent is:—

1. In a process for the treatment of finely divided oxidized copper-containing material, the steps comprising first heating the material in a reducing atmosphere so as to produce sub-divided metallic copper, then cooling the copper in a reducing atmosphere and subsequently minimizing the exposed surface by pressing the material into blocks.

2. In a process for the treatment of finely divided copper oxide the steps comprising first heating the material in a reducing atmosphere so as to produce subdivided metallic copper, then cooling the copper in a reducing atmosphere and subsequently minimizing the exposed surface by pressing the material into blocks.

3. In a process for the treatment of finely divided oxidized copper-containing material, the steps comprising first heating the material in a reducing atmosphere at a temperature below the melting-point of copper so as to produce subdivided metallic copper, then cooling the copper in a reducing atmosphere and subsequently minimizing the exposed surface by pressing the material into blocks.

4. In a process for the preparation of copper for melting, the steps comprising heating in a reducing atmosphere finely divided copper oxide precipitated from ammoniacal solution so as to produce subdivided metallic copper, then the cooling of the copper in a reducing atmosphere and subsequently minimizing the exposed surface by pressing the material into blocks.

5. In a process for the production of homogeneous refined metallic copper from finely divided oxidized copper material the steps comprising first heating the material in a reducing atmosphere at a temperature below the melting point of copper so as to produce subdivided metallic copper, then cooling the copper in a reducing atmosphere, subsequently minimizing the exposed surface by pressing the material into blocks and melting the blocks in a refining furnace substantially as set forth.

In testimony whereof we have signed our names to this specification.

WALTER GEORGE PERKINS.
WALTER HENRY BEASLEY.